Patented Feb. 21, 1928.

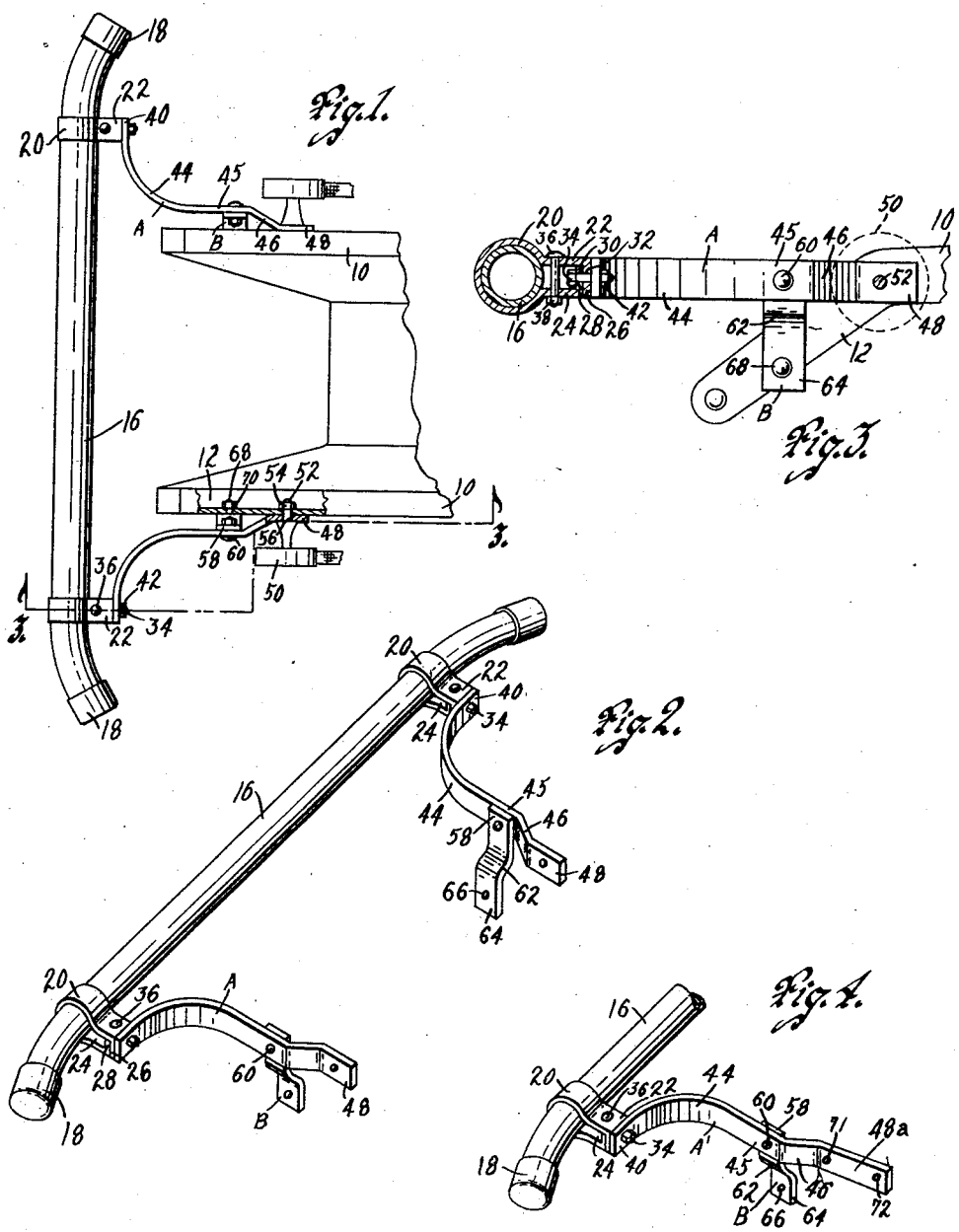

1,660,044

UNITED STATES PATENT OFFICE.

ALGOT W. NORDGREN AND GUSTAV A. BURANDT, OF ST. PAUL, MINNESOTA, ASSIGNORS TO MARQUETTE MANUFACTURING COMPANY, OF ST. PAUL, MINNESOTA.

BUMPER AND BUMPER SUPPORT.

Application filed September 6, 1927. Serial No. 217,702.

The object of our invention is to provide a bumper and bumper support therefor, the whole being of very simple and inexpensive construction.

More particularly, it is our object to provide such a structure peculiarly adapted for installation as an accessory on certain makes of cars, for instance for a front bumper for a Whippet, or for a Star car.

With these and other objects in view, our invention consists in the construction, arrangement and combination of the various parts of our bumper and bumper support, whereby the objects contemplated are attained, as hereinafter more fully set forth, pointed out in our claims, and illustrated in the accompanying drawings, in which:

Figure 1 is a top or plan view of a bumper and bumper construction embodying our invention installed on that portion of a car frame shown, parts being shown in section and parts being broken away.

Figure 2 is a perspective view of a bumper and one of the supports therefor.

Figure 3 is a detail, sectional view taken on the line 3—3 of Figure 1; and

Figure 4 is a perspective view of a portion of a bumper and a slightly modified form of support.

In the drawings herewith, we have used the reference numeral 10 to indicate generally the longitudinal frame members of an automobile chassis, which are usually made in the form of inwardly opening channel bars.

On several cars of well-known make, the frame members 10 have at their forward ends the downwardly inclined horns 12.

In providing a front bumper and support structure, we use a bumper element 16, preferably having the form of a cylindrical member, curved slightly rearwardly at its ends and having the end caps 18.

For mounting the bumper element 16 on the frame members 10 of the car, we provide the following means:

Near each end of the bumper element 16 is a resilient split ring 20, receiving the bumper and having its ends extended rearwardly as at 22 and 24 in spaced relation with each other.

At the rear end of the portion 22, it has an end 26 bent downwardly in a substantially vertical plane.

At the rear end of the portion 24 is an end bent upwardly as at 28 in a substantially vertical plane, parallel with and adjacent to the end 26.

The ends 26 and 28 are provided with registering holes 30 and 32 to receive a bolt 34.

The portions 22 and 24 are adjustably connected together by means of a bolt 36 and nut 38.

We provide supports indicated generally at A, each comprising a portion or forward end 40 arranged parallel with and adjacent to the end 28 and mounted on the bolt 34 and fastened thereto by means of a nut 42.

Extending inwardly and curved rearwardly from the portion 40 of the support A is a portion 44 from which a portion 45 extends rearwardly at right angles to the main axis of the bumper element 16, and arranged to be parallel with but spaced from the adjacent frame member 10 of the car on which the bumper and bumper support are installed.

At the rear end of the portion 45 is a portion 46 inclined inwardly and terminating in a rearwardly extending portion 48 arranged adjacent to and parallel with a frame member 10 when the parts are assembled.

On the cars for which our device is intended, there is usually provided a snubber 50 connected with the frame member 10 by means of a bolt 52 on which is the nut 54.

In installing the support A on the car, the nut 54 is removed and the bolt 52 is inserted through a hole 56 in the portion 48 and then through the frame member 10, whereupon the nut 54 is replaced.

For affording a further connection between the support A and the frame of the car, we provide small brackets B, each comprising an upright portion 58 bolted to the portion 45 of the support A by means of the bolt 60.

At the lower end of the portion 58 of the bracket B is an inwardly inclined portion 62, terminating in a downwardly extending portion 64, having the hole 66. A bolt 68 is extended through the hole 66 and through the horn 12 and receives the nut 70.

We have described the structure shown in Figures 1, 2 and 3, which is particularly intended for use on Whippet cars for a front bumper.

The parts are so arranged as to be peculiarly adapted for mounting on the Whippet, and are of simple construction and afford a rigid support for the bumper.

The bumper structure may be shipped with the supports A attached, or they may be detached and shipped separately.

The installation on the car is easy because of the small number of parts and the simple method of fastening to the car, and also particularly because the rings 20 may be easily adjusted lengthwise on the bumper element 16 for locating them the proper distance apart on the bumper element.

In Figure 4, we have shown a slightly modified form of our device adapted particularly for use as a front bumper on a Star car.

In this form the bumper element 16 is used in the same form as has already been described. The ring 20 at each end of the bumper element 16 is the same as that heretofore described.

The support A' is the same as the support A, except that instead of the portion 48, we provide the portion 48ª. The portion 48ª is slightly longer than the portion 48 and is provided with two bolt holes 70 and 72 to receive bolts, whereby the support A' may be mounted on the frame member of the car at longitudinally spaced points.

By making the part 48 a little longer and forming the part 48ª and providing the additional bolt hole in that part, we have provided a bumper for Star cars.

The bumper elements and rings are the same for both installations and the shaping of the support A' is done by the same operations that are followed in making the support A.

We claim as our invention:

1. In a bumper and bumper support of the class described, a tubular bumper element adapted to extend across one end of a car spaced therefrom, a pair of spaced, split rings receiving said bumper element and formed at their ends with rearwardly extending, horizontal, vertically spaced portions terminating in portions extending respectively downwardly and upwardly in parallel adjacent positions, a bolt and nut for gripping together the horizontal portions of each ring for gripping the bumper element, a support for connecting each ring with the car frame, comprising a portion arranged adjacent to said last-described end portions and bolted thereto, a portion extending over from said first support portion inwardly and rearwardly, thence rearwardly, and thence inwardly, and thence again rearwardly, means for fastening said last-described rearwardly extending portion to a car frame, a bracket secured to said first described rearwardly extending portion of the support and projecting downwardly and inwardly and adapted to be secured to a car frame.

2. In a device of the class described, a cylindrical bumper adapted to be extended across the front of a car spaced therefrom, a pair of spaced, split rings receiving said bumper element having rearwardly projecting, parallel spaced end portions, bolts for adjustably fastening said parallel portions together for causing the rings to grip the bumper element, said rings having portions at the rear ends of said parallel horizontal portions extending respectively downwardly and upwardly in parallel adjacent portions, a pair of supports each comprising an end portion, means for fastening said support end portion to said upwardly and downwardly extending portions, said support having portions inclined inwardly and rearwardly from its end above described, and a portion extending thence rearwardly, and a portion extending thence inwardly and rearwardly, and a portion extending thence rearwardly, and means for securing supports to a car frame.

3. In a structure of the class described, a bumper member, a pair of spaced, split rings receiving the bumper element, each having at its ends vertically spaced, rearwardly projecting parallel portions terminating in ends extending respectively downwardly and upwardly in adjacent parallel positions, means for adjustably gripping said horizontal, parallel portions together, and means connected with said downwardly and upwardly extending portions for supporting said bumper on a car.

Des Moines, Iowa, July 28, 1927.
ALGOT W. NORDGREN.
GUSTAV A. BURANDT.